United States Patent
Kopanic et al.

(10) Patent No.: US 6,663,307 B2
(45) Date of Patent: Dec. 16, 2003

(54) APPARATUS FOR SPRAYING A REMOTE TARGET OR AREA

(75) Inventors: Robert J. Kopanic, Racine, WI (US); Jonathan N. Mandell, Gurnee, IL (US); William G. Madala, Racine, WI (US); Douglas A. Soller, Racine, WI (US); Nathan R. Westphal, Racine, WI (US); Dale Aberegg, Mt. Vernon, OH (US); Cathal L. Fahy, Columbus, OH (US); Tracey A. Frosch, Racine, WI (US); Brian K. Linstedt, Ostrander, OH (US); Steven A. Zach, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/208,299

(22) Filed: Jul. 30, 2002

(65) Prior Publication Data

US 2003/0053846 A1 Mar. 20, 2003

Related U.S. Application Data

(63) Continuation-in-part of application No. 09/951,632, filed on Sep. 14, 2001, now Pat. No. 6,551,001.

(51) Int. Cl.$^7$ .............................. A46B 5/02; A47L 13/30
(52) U.S. Cl. ................. 401/190; 401/263; 401/261; 222/174; 222/608; 239/532; 239/280; 239/578
(58) Field of Search ................. 401/190, 263, 401/267, 261; 222/402.15, 174, 608; 239/532, 280, 337, 578, 754, 150

(56) References Cited

U.S. PATENT DOCUMENTS

| | | | |
|---|---|---|---|
| 2,893,606 A | | 7/1959 | Hawkins |
| 3,229,589 A | * | 1/1966 | Conroy et al. ............ 91/416 |
| 3,871,557 A | | 3/1975 | Smrt |
| 4,092,000 A | | 5/1978 | Offutt, III |
| 4,323,196 A | | 4/1982 | Logue et al. |
| 4,886,191 A | | 12/1989 | Yoshitomi |
| D353,540 S | | 12/1994 | Hughes |
| 5,518,148 A | | 5/1996 | Smrt |
| 5,775,595 A | | 7/1998 | Knodel et al. |
| 6,102,305 A | | 8/2000 | Chapman et al. |
| 6,280,072 B1 | | 8/2001 | Poston |
| 6,390,336 B1 | * | 5/2002 | Orozco .................. 222/162 |
| 2003/0126709 A1 | | 7/2003 | Policicchio et al. |
| 2003/0126710 A1 | | 7/2003 | Policicchio et al. |
| 2003/0127108 A1 | | 7/2003 | Policicchio et al. |

FOREIGN PATENT DOCUMENTS

| | | | |
|---|---|---|---|
| EP | 0819619 A1 | 1/1998 | ......... B65D/83/16 |
| GB | 2011549 A | 7/1979 | ......... B65D/83/14 |
| GB | 2018907 | 10/1979 | ......... B65D/83/14 |
| JP | 07222944 | 8/1995 | ......... B05B/9/04 |

* cited by examiner

Primary Examiner—David J. Walczak (57) ABSTRACT

A device for spraying pesticides and/or agricultural treatment chemicals has a housing configured to retain a spray canister, an actuator rod on the housing configured to contact an overcap attached to the canister, a shaft connected to the housing, and a linkage to reverse a triggering force so that the actuator pushes against the overcap. Attachments can be provided in front of the sprayer nozzle, such as a shroud to limit back spray, a rake to disturb soil prior to treatment, a tapered director to focus spray in corners, or a fan shaped outlet to provide a wide spray.

18 Claims, 10 Drawing Sheets

APPARATUS FOR SPRAYING A REMOTE TARGET OR AREA

CROSS REFERENCE TO RELATED APPLICATIONS

This application is a continuation-in-part of U.S. application Ser. No. 09/951,632, filed Sep. 14, 2001, now U.S. Pat. No. 6,551,001.

STATEMENT OF FEDERALLY SPONSORED RESEARCH AND DEVELOPMENT

Not applicable

Background of the Invention

The invention relates to a device for actuating a spray canister at a location somewhat remote from the use. More particularly, it relates to such a device particularly configured to deliver a pesticide from an aerosol can by remote activation.

Common aerosol cans and similar pressurized spray canisters are most frequently actuated by a user directly pressing a button or other structure that activates the can's valve. Typically, this means that the user must directly hold the canister in his or her hand, and the surface to be sprayed must be no further away than can be reached by the spray pattern of the canister.

This can present problems. For example, except for some specialty sprays designed to project a narrow stream a long distance (such as certain conventional wasp sprayers), most common aerosol sprays tend to fan out quite quickly. Consequently, a user cannot apply the spray to a small, localized area such as a window sill, an area under a bush or other plant, or the like, unless the can (and therefore the user's hand) can be within inches of the target area.

In any event, many users would prefer to keep their distance from certain sprays, such as pesticides, regardless of the capability of the sprayer. Even when there is no danger in the proper use of the pesticide, they desire separation simply as a matter of aesthetic preference.

U.S. Pat. No. 5,518,148 teaches a device for remotely triggering an aerosol can filled with an active (optionally an insecticide, cleaner or other specified chemical). However, the actuator mechanism is awkward in terms of its interface between the can valve stem and the device pressing against it.

U.S. Pat. No. 3,871,557 teaches another remotely activated aerosol can. However, it requires a flimsy cord for operation.

U.S. Pat. No. 4,886,191 teaches a clamping system for placing an aerosol can along a remote triggering system. However, the connection is somewhat awkward.

U.S. Pat. Nos. 2,893,606 and 4,092,000 teach still other remotely actuated aerosol cans, but disclose the can in a perpendicular position relative to the triggering rod, presenting an awkward configuration.

Aside from the individual deficiencies described above, the prior designs typically are deficient in various other ways as well. For example, a user can sometimes experience back spray showering back down on them when a can is sprayed upwardly—for example to treat the underside of a soffit. Also, sprays directed toward ground insects or other common targets are not as effective as they might otherwise be when the area where the insect is likely to be cannot be uncovered without a separate tool.

Thus, a need still exists for an improved remote sprayer unit, particularly with respect to shrouding the user from back spray and permitting the device to also optimize the area where the insects are likely to be.

SUMMARY OF THE INVENTION

In one aspect the invention provides a device suitable for spraying an active selected from the group consisting of pesticidal sprays and agricultural chemical sprays from a spray canister. Examples of pesticidal sprays include, without limitation, insecticides, insect repellents, insect growth regulators, rodenticides, and other animal control poisons and repellents capable of being sprayed by aerosol means. Examples of agricultural chemical sprays include without limitation herbicides and fertilizers capable of being sprayed by aerosol means. Particularly, preferred sprays are ant and roach sprays, wasp and hornet sprays, spider sprays, fire ant killers, flea sprays, outdoor space repellents, tick sprays, grub control sprays, anti-termite sprays, plant sprays to prevent insect infestation, rose and flower bed fertilizing sprays, weed killer spot treaters, and the like.

It should be appreciated that the present invention is not to be limited by the specifics of the spray formulation as numerous liquid and liquid/gas formulations, and numerous pesticides and agricultural chemicals may be used with the present invention. One type of insecticide, for example, includes synthetic pyrethroids such as cypermethrin, cyfluthrin, and lambda-cyhalothrin, natural pyrethrum (e.g. pyrethrins), and organo phosphates such as chlorpyrifos. Other examples of synthetic pyrethroids are allethrin forte, phenothrin, d-phenothrin, tetramethrin, resmethrin, esbiothrin, are allethrin, permethrin, d-trans allethrin and kadethrin. Examples of other insecticides can be found in U.S. Pat. Nos. 4,595,679 and 5,792,465, the disclosures of which are hereby incorporated by reference as though fully set forth herein.

It is important that the system be designed for canisters have an actuator cap attached thereto (as distinguished from a simple push button) such that movement of a portion of the cap against a valve stem (e.g. the stem itself or a projection or button attached thereto) of the canister can cause the spray to exit from the canister.

The device has a housing for retaining the spray canister, an actuator rod mounted on the housing so as to be capable of pushing against a pivotable portion of the cap if the canister is mounted in the housing, and means for reversing an actuating force. One such means is a pivot link pivotally attached to the housing about a pivot point. The pivot link has a first end and a second end separated by the pivot point there between, the pivot point being positioned to allow contact between the actuator rod and the first end of the pivot link.

There may also be a shaft assembly connected to the housing and a core slidably disposed there within. The slidable core is adapted to contact the second end of the pivot link and rotate the pivot link about the pivot point. There may also be a handle attached to the shaft assembly having a trigger.

Movement of the trigger causes a sliding of the slidable core in a first direction, which in turn pivots the pivot link, bringing the actuator rod into contact with the cap if the canister is mounted in the housing. In a preferred form the housing has a front panel and a back panel defining a space there between, and the actuator rod and the pivot link are disposed within the space defined by the front panel and the back panel.

The invention includes such a device alone, and/or in combination with the spray can. Also, a variety of attachments may be connected to the device. For example, there may be a spray shroud mounted adjacent an end of the device opposite the handle (to limit back spray when the device is pointed partially upward), a second handle positioned between the spray shroud and the trigger (to assist in ergonomics), a rake positioned at an end of the device opposite the handle (to loosen the ground before spraying to expose infested areas), a guide lip attached adjacent to a lower edge of the housing at an end of the device opposite the handle (to protect floor areas and/or to direct the device under a counter edge), or a tapering spray guide attached adjacent an end of the device opposite the handle (to facilitate spraying in tight corners).

In another preferred form the shaft assembly can have a lower hollow shaft, an upper hollow shaft attached to the lower hollow shaft, a lower slidable core disposed within the lower hollow shaft, and an upper slidable core disposed within the upper hollow shaft, with the handle being attached to the upper hollow shaft, and the lower hollow shaft being is attached to the housing.

Also preferably there can be a biasing element configured to bias the actuator rod away from the cap (so that spray will automatically stop when the trigger is released), and the housing has a spring-biased retainer suitable to removably retain the canister in the housing if the canister is placed in the housing.

It will be appreciated from the following discussion and the disclosure above that various embodiments of the invention have a variety of desirable advantages. For example, the invention permits pesticides and agricultural chemicals to be sprayed with the human's hands being positioned remote from the spray outlet. The device is designed to be lightweight and to readily accept replacement canisters once the active is exhausted from a can.

The can is positioned essentially parallel to the support shaft so that the device can extend through small passageways and so that handling the device is not awkward. The canister is securely supported with the spray pointed away from the user, yet activation is secure and reliable. The varied attachment accessories limit back spray, provide better spray focus, protect floor areas from unwanted spray, and improve the effectiveness of spraying soil. The device is inexpensive to produce and is intuitive so that is readily usable by the average consumer.

These and still other objects and advantages of the present invention will be appreciated by reading the following description of the preferred embodiments. While these embodiments are being described, it should be appreciated that they do not represent the full scope of the invention. Rather, the claims should be looked to in order to judge the full scope of the invention.

DETAILED DESCRIPTION OF THE PREFERRED EMBODIMENTS OVERVIEW

The invention provides an axially extended container (preferably a pressurized container, even more preferably an aerosol container) having a valve stem and capable of delivering a selected pesticide or agricultural chemical in a direction substantially axial to the container when the valve is actuated.

There is provided an axially extended extension holder having a handle end (referred to as the proximal or upper end of the extension holder, for ease of description) and a housing remote from the handle end (at the distal or lower end of the extension holder), the housing being capable of receiving and holding the container in replaceable relation and oriented generally axial to the extension holder. The extension holder also has linkages user-activatable from the handle end by which a user may actuate the container's valve to deliver pesticide in a direction away from the user and generally axially to the extension holder.

The invention facilitates spraying the active upwardly, as may be required when treating elevated structures, such as the underside of a soffit or parts of a ceiling, tree, or other target surface or area located above the head of a user. A common example of the need to spray at such locations is for treating wasp nests along the roof gutter of a house.

Alternatively, the device is provided at a distal end with an attachment to make it more suitable for use adjacent crevices or corners, or to treat soil areas.

Specific Embodiments

Figure 1:
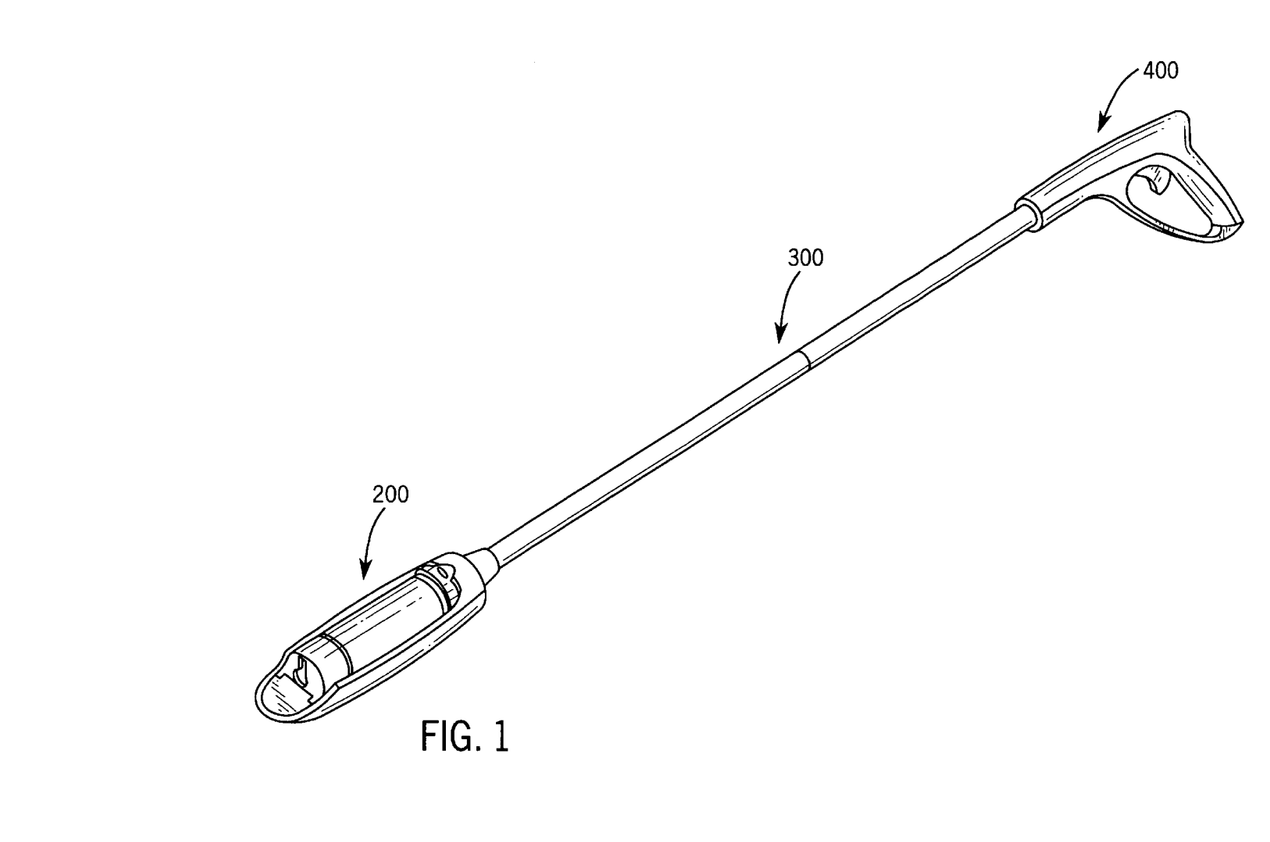
FIG. 1 shows a perspective view of a sprayer device in accordance with the present invention.

The embodiments presently preferred are illustrated in the figures. FIG. 1 shows a spray device in accordance with the present invention. The device 1 comprises a housing generally 200, a shaft assembly generally 300, and a handle assembly generally 400.

Figure 2:
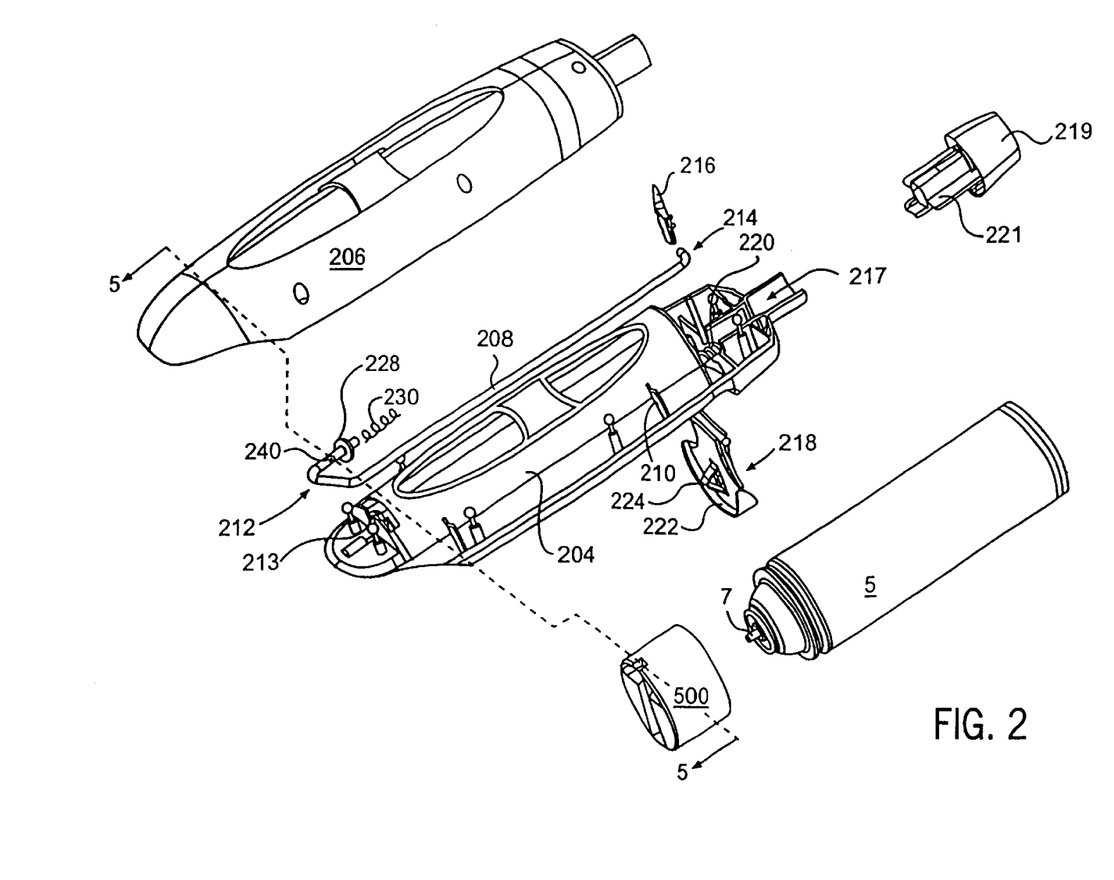
FIG. 2 shows an exploded perspective view of a housing assembly and canister for use with this invention.

As shown in FIG. 2, the housing 200 has a front panel 204 and a rear panel 206 held together preferably by screws (not shown). Both of the panels 204, 206 includes a half-cylinder at their top (or proximal end), so that when the two panels 204, 206 are joined, a guide hole 217 results. However, the half cylinders do not meet, leaving a slot in the guide hole 217. A collar 219 slides into the guide hole 217 and two fins 221 of the collar 219 slide into the slots.

Preferably, the collar 219 and panels 204, 206 are joined together by screws. Other means of joining the panels and collar are also possible, such as adhesive, plastic fasteners, and the like. The panels 204, 206 define a space into which an actuator rod 208 is slidably mounted. The actuator rod 208 is preferably slidably supported on two protrusions 210, but more or fewer than two may also be provided. Also, an actuator rod guiding portion (not shown), such as a groove, may be formed in one or more of the protrusions to aid in guiding the actuator rod 208 during its movement.

The bottom end 212 of the actuator rod 208 is bent in a J-shape and includes a flattened portion 240, which supports a washer 228, while the top end 214 is bent at an angle, preferably a right angle, to contact a pivot link 216. The flattened portion 240 of the actuator rod 208 acts as a stop for the washer 228. That is, the washer 228 may only slide onto the actuator rod 208 up to the flattened portion 240. Of course, other stops may be used to position the washer 228 such as, by way of non-limiting examples, a dimple or bead formed on the actuator rod 208, or a reduced cross-section portion on the actuator rod 208 used in conjunction with a washer having a cross-section so as to mate with that reduced cross-section of the actuator rod 208.

The end 212 of the actuator rod 208 protrudes through an aperture 213 in the front panel 204 to be able to contact an overcap generally 500 on a canister 5, which is preferably a spray canister such as, for example, of the aerosol type. The washer 228 acts as a base for a spring 230, which biases the actuator rod 208 downwards, away from the overcap 500.

Figure 3:
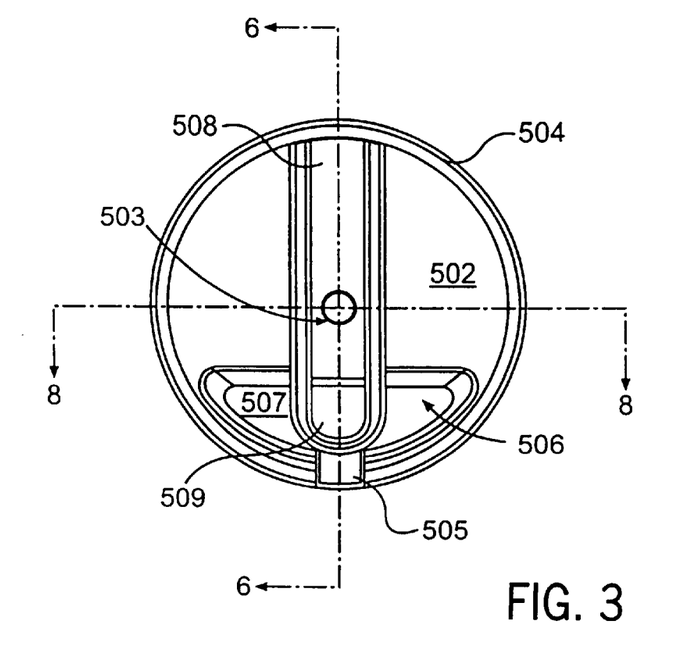
FIG. 3 shows a top plan view of an overcap of this invention.

FIG. 3 shows the overcap 500, which generally comprises a top surface 502, a nozzle 503, a cylindrical wall 504 depending from the top surface 502, a lever arm 508 and an actuator port 505. The cylindrical wall 504 is attached to the spray canister in essentially axially non-moving relation, and the cylindrical wall and other parts of the over cap 500 that are rigidly attached directly or indirectly to the cylindrical wall will be referred to collectively herein as non-moving parts secured to the spray canister in non-moving relation. The actuator port 505 is adapted to receive a terminal end of the bottom end 212 of the actuator rod 208, so that the actuator rod 208 can contact the lever arm 508 at a pad 509.

Figure 5:
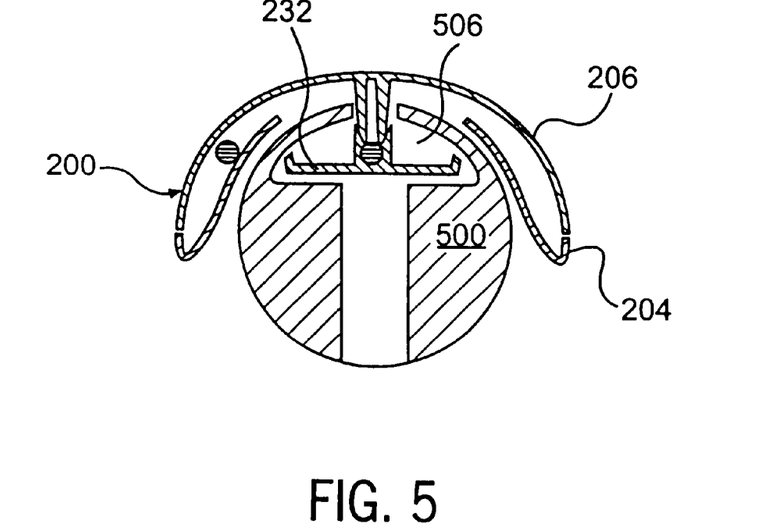
FIG. 5 shows a sectional view taken along line 5—5 in FIG. 2 after the housing has been assembled and the overcap has placed in the housing.

FIG. 3 further shows the top surface 502 including a D-shaped recess 506. The D-shaped recess 506 ensures that the overcap 500 is always correctly oriented in the housing 200. As shown in FIG. 5, the housing 200 includes an aligning protrusion 232 for mating with, or receiving there over, the walls of the D-shaped recess 506. In this way, the orientation of the overcap 500 is assured. Of course, the D-shaped recess 506 and the aligning protrusion 232 may take on a variety of shapes, and need not be exactly as illustrated. For example, a plurality of holes and posts may be used.

Figure 6:
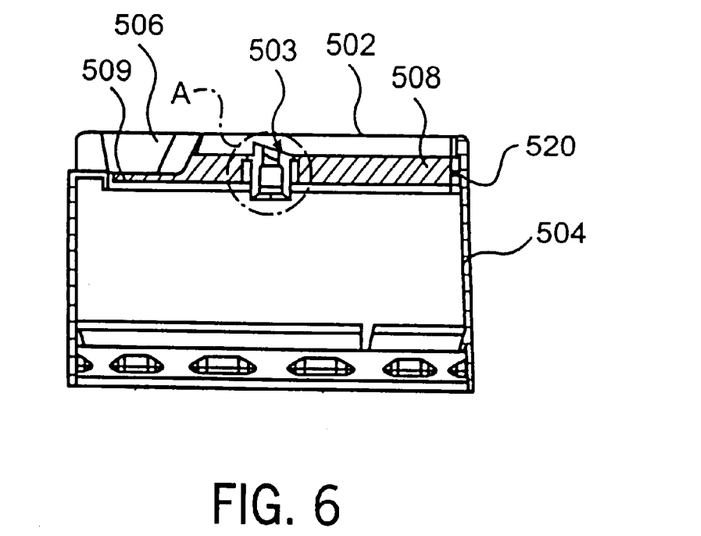
FIG. 6 shows a sectional view along the line 6—6 in FIG. 3.
Figure 7:
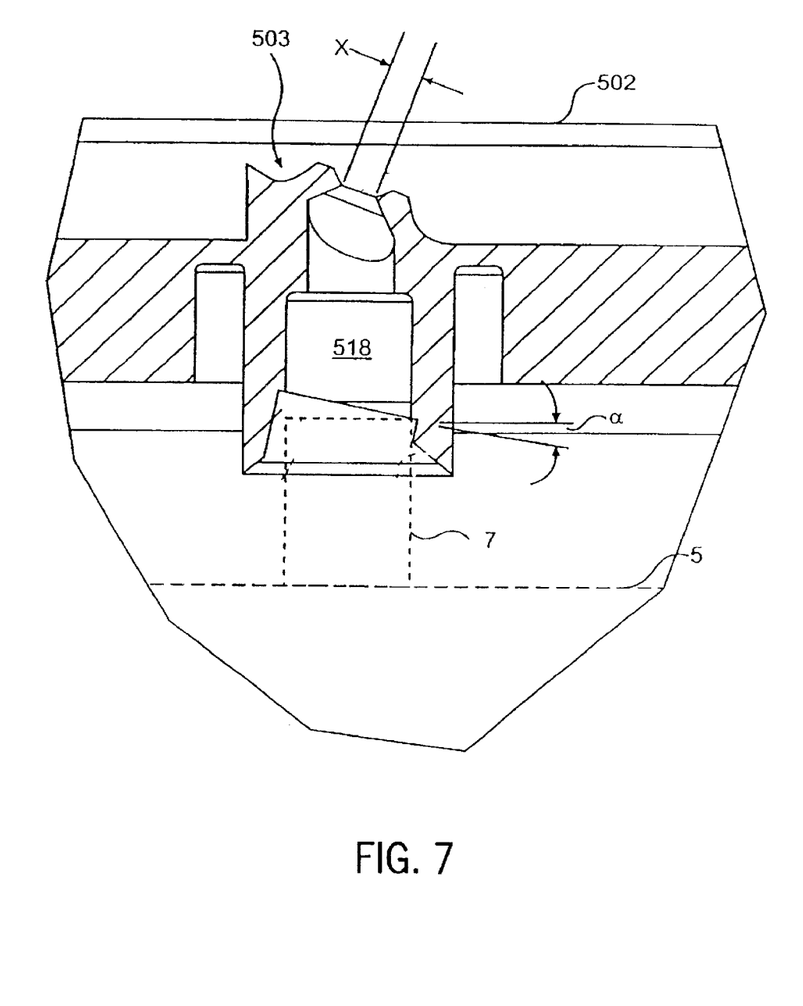
FIG. 7 is an enlarged detailed sectional view of area A in FIG. 6.
Figure 8:
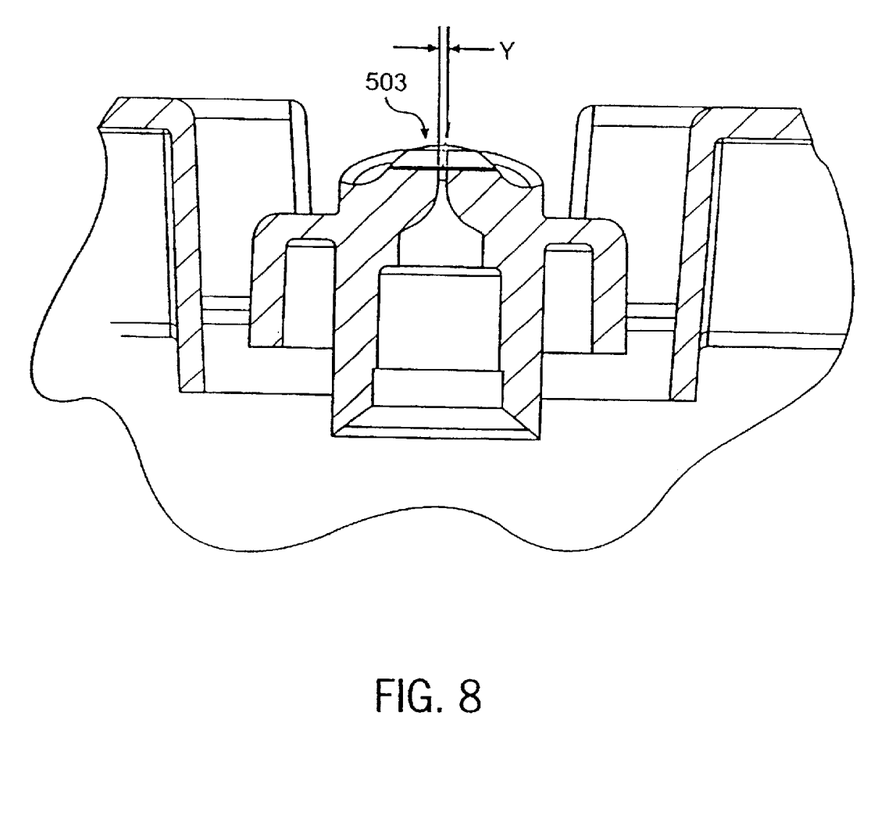
FIG. 8 is a partial sectional view taken along line 8—8 in FIG. 3.

As shown in FIG. 6, the lever arm 508 substantially traverses the diameter of the top surface 502, and is attached to the cylindrical wall 504 or to another non-moving part secured to the spray canister in non-moving relation at a pivot point 520, which is positioned at an end opposite from the D-shaped recess 506. The pivoting lever arm 508 is separated from the top surface 502 and the D-shaped recess 506.

Figure 4:
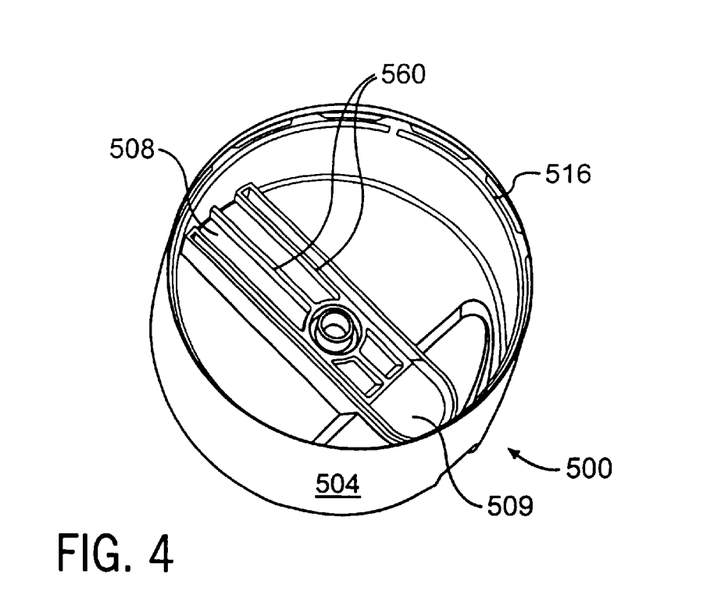
FIG. 4 shows a perspective view of an underside of the overcap of FIG. 3.

As shown in FIGS. 3 and 4, the lever arm 508 terminates in the D-shaped recess 506, and is not connected to a floor 507 of the D-shaped recess 506. As such, the pivoting lever arm 508 is free to move out of the plane of the floor 507 of the D-shaped recess 506. A thickness of the lever arm 508 is thinned at the pivot point 520, as shown in FIG. 6, to reduce the force required to pivot the lever arm 508 about the pivot point 520.

Preferably, the lever arm 508 is disposed below the top surface 502 to minimize the risk of unknowing or accidental movement of the lever arm 508, but it may be on the same level as or above the top surface as well. In addition, the lever arm 508 preferably has ribs 560 on its underside to increase its rigidity, as shown in FIG. 4.

As shown in FIG. 4, the interior surface of the cylindrical wall 504 has a plurality of ribs 516 at its base. These ribs 516 engage a rim on the canister 5, holding the overcap 500 securely to the canister 5. Of course, alternative means to secure the overcap 500 to the canister 5 may be used, such as conventional valve cup rim attachment, adhesive, or even integrally forming the overcap 500 with the canister 5.

Figure 9:
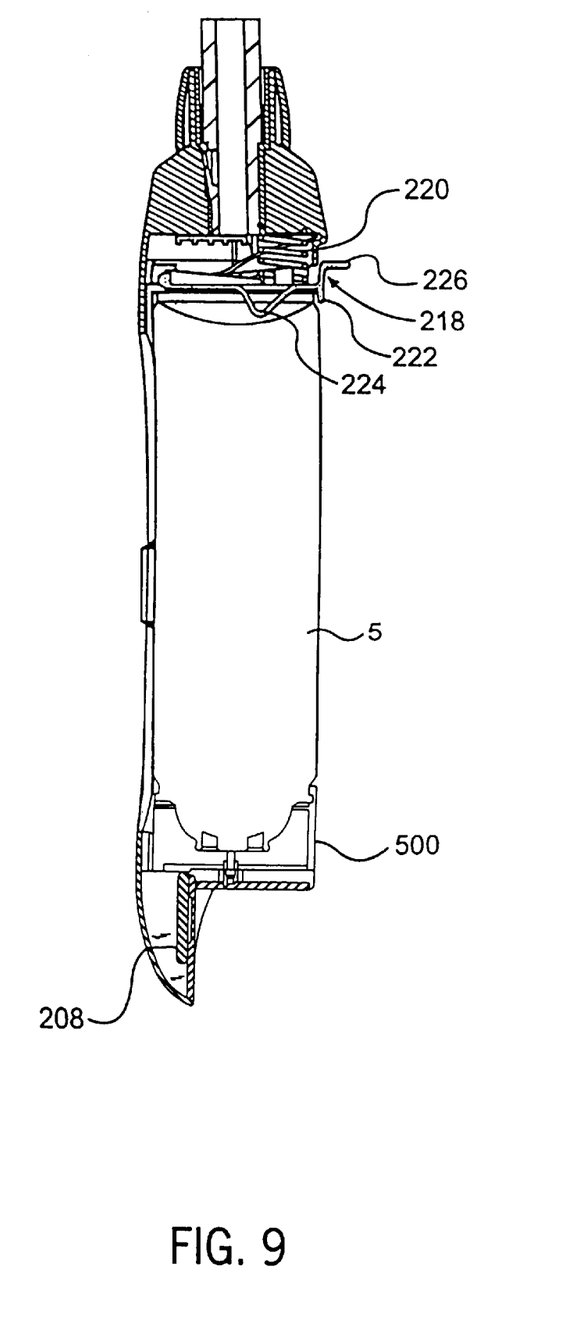
FIG. 9 is a sectional view of a housing holding the canister.

As illustrated in FIGS. 2, 5, and 9, the housing 200 retains the canister 5/overcap 500 assembly using a retainer 218 and the aligning protrusion 232. The aligning protrusion 232 acts not only to provide for a proper orientation of the overcap 500, but also acts as a support to retain the overcap end of the canister 5/overcap 500 assembly in the housing 200. The canister end of the canister 5/overcap 500 assembly is retained in the housing 200 by the retainer 218.

The retainer 218 is spring-biased against the canister 5 by a spring 220 and retains the canister 5 by a friction force between the retainer 218 and the canister bottom. In addition, the retainer 218 includes a lip 222 along its outer periphery, as shown in FIG. 2, that contacts an outer surface of the canister 5 and prevents the canister 5/overcap 500 assembly from dislodging or falling out of the housing 200.

The retainer 218 further includes an abutment 224 protruding from a surface of the retainer 218, which contacts a bottom surface of the canister 5 to also prevent the canister 5/overcap 500 assembly from freely releasing or falling out of the housing 200. As shown in FIG. 9, the retainer 218 preferably includes a tongue or handle 226, so that the retainer 218 can be easily biased against the spring 220 by a user to remove the canister 5 from the housing 200.

To install the canister 5/overcap 500 assembly into the housing 200, a user first inserts the overcap end of the canister 5/overcap 500 assembly into the housing 200, causing the D-shaped recess 506 to matingly receive the aligning protrusion 232. In this position, the D-shaped recess 506 of the overcap 500 rests on the aligning protrusion 232. Then, the user presses the canister end of the canister 5/overcap 500 assembly into the housing 200 until the retainer 218 fittingly engages the canister end of the canister 5/overcap 500 assembly.

Alternative means for holding the canister end of the canister 5/overcap 500 assembly are also contemplated, and the retainer 218 may be omitted without departing from the scope of the invention. For example, a clip may be integrally formed in the front panel 204, allowing the canister 5 to snap into the housing 200. In addition, an elastic strap may hold the canister 5 to the housing 200. Variations of the retainer 218 as shown may also be used, such as a retainer 218 without any or all of the abutment 224, handle 226, and lip 222.

Figure 10:
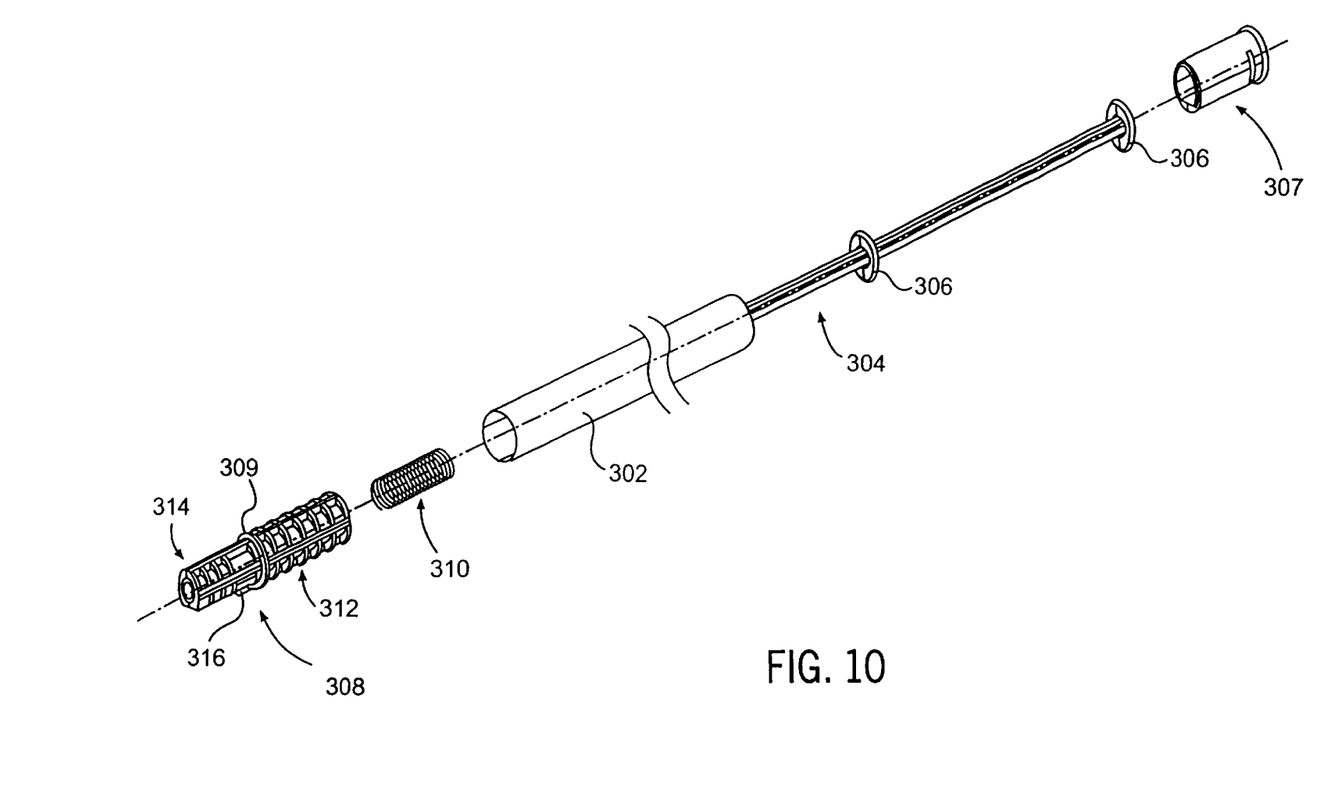
FIG. 10 is an exploded perspective view of a lower shaft portion of the invention.
Figure 11:
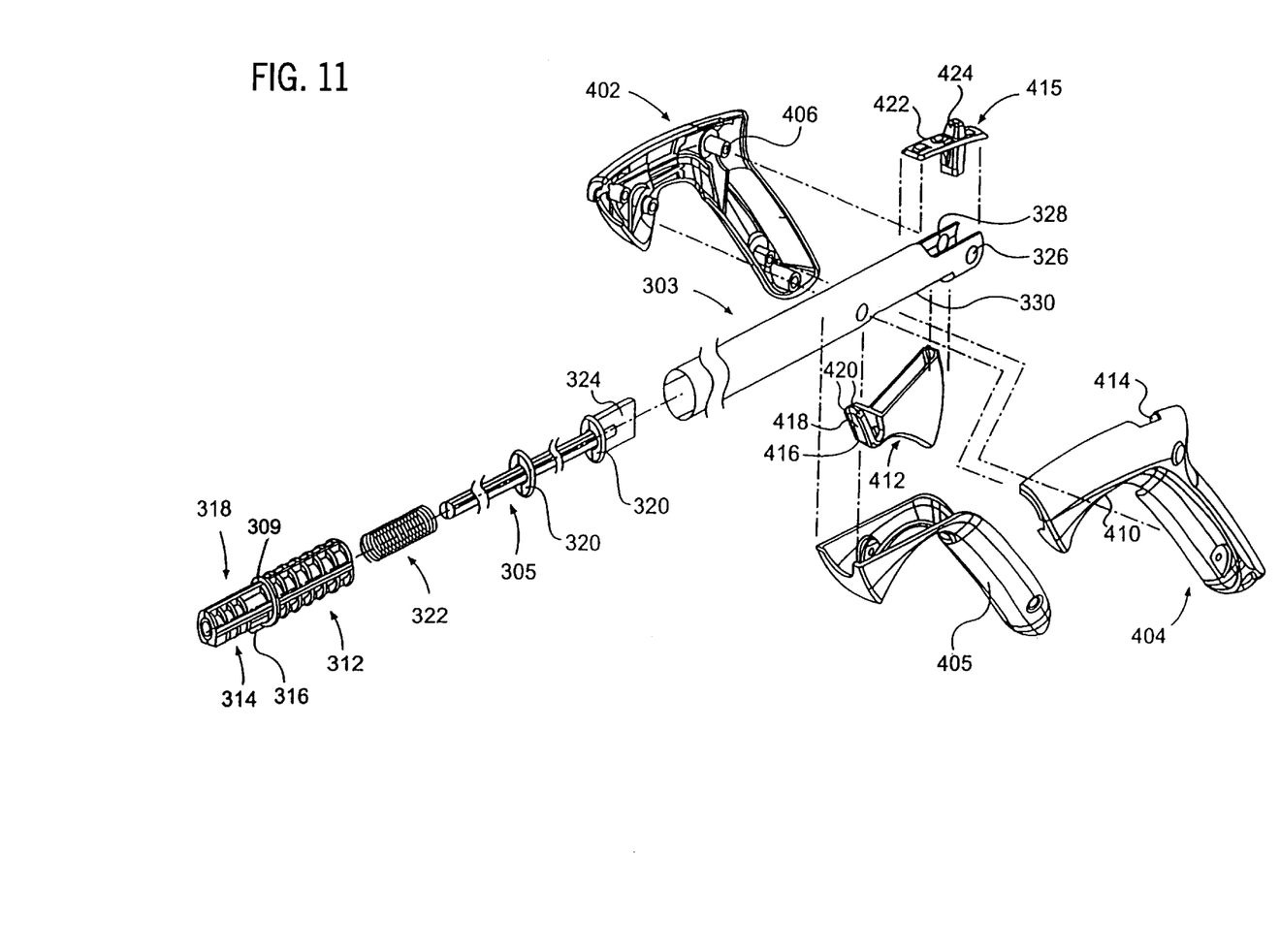
FIG. 11 is an exploded perspective view of an upper shaft portion, handle and trigger portion of the present invention.

Referring to FIGS. 10 and 11, the shaft assembly 300 connects, preferably in a removable manner, to the collar 219 of the housing 200, as discussed below, and comprises a lower hollow shaft 302 into which a slidable lower core 304 fits and an upper hollow shaft 303 into which a slidable upper core 305 fits. The lower core 304 has a plurality of flanges 306, which keep the lower core 304 centered in the lower hollow shaft 302.

A housing plug 308 is provided at the end of the lower hollow shaft 302 nearest the housing 200, and is engaged with that end of the lower hollow shaft 302. Such engagement may be effected, by way of non-limiting examples, through a friction fit, an adhesive bond, a bond formed by thermal or ultrasonic fusion, pins, screws, crimping, or the like. At a distal end of the lower hollow shaft 302, furthest from the housing 200, is a female plug 307. The female plug 307 is also engaged, in a manner as described above with respect to the housing plug 308, with the lower hollow shaft 302. A spring 310 between one of the plurality of flanges 306 and the housing plug 308 keeps the lower core 304 biased away from the housing plug 308.

As indicated in FIG. 11, the upper hollow shaft 303 houses an upper core 305 slidably disposed therein. The upper core 305, similarly to the lower core 304, has a plurality of flanges 320. A connecting plug 318 is engaged, in a manner as described above with respect to the housing plug 308, with the upper hollow shaft 303 at a connecting end of the upper hollow shaft 303 (that is, the end nearest the lower hollow shaft 302).

The housing plug 308 and the connecting plug 318 each comprises a plurality of rings joined by longitudinal ribs, and is generally divided by a large ring 309 into an upper half 312 and a lower half 314. The upper half 312 of each of the housing plug 308 and connecting plug 318 is shaped and sized to fit snugly into each of the lower hollow shaft 302 and the upper hollow shaft 303, respectively.

The lower half 314 has a bullet-shaped cross section (i.e., one flat side), ensuring that the housing plug 308 can only be inserted in one way into either the collar 219 of the housing 200 or the female plug 307. Each plug 308, 318 has a continuous, circular cavity formed there through, which is shaped to permit passage of the appropriate core 304, 305. The housing plug 308 and connecting plug 318 are preferably shaped slightly differently, so that the connecting plug 318 and the upper hollow shaft 303 cannot be mistakenly inserted into the housing 200.

Preferably, the lower half 314 of each plug 308, 318 has a ramped key 316, which snaps into a recess, indentation, notch, window, or the like formed in an interior wall of the collar 219 (in the case of the housing plug 308) or of the female plug 307 (in the case of the connecting plug 318). The window and ramped key mechanism secures, either permanently or removably, the housing plug 308 to the housing 200 and the connecting plug 318 to the lower hollow shaft 302.

In one example, the ramped key 316 providing for the permanent connection is a flexible, wing-like protrusion having a terminal end that flexes inwardly upon insertion into either the collar 219 or the female plug 307. The wing-like protrusion remains inwardly flexed until reaching the window, at which point the terminal end of the wing-like protrusion extends into the window, thereby creating the permanent connection.

The ramped key 316 providing for the removable connection can be a wing-like protrusion having an outwardly ramped surface integral with an inwardly ramped surface, where a peak is formed there between. Upon insertion into either the collar 219 or the female plug 307, this wing-like protrusion remains inwardly flexed until reaching the window, at which point the peak of the wing-like protrusion extends into the window. This wing-like protrusion is rendered removable by the inwardly ramped surface, which, upon exerting a force to withdraw the lower half 314 from the collar 219 or the female plug 307, causes the wing-like protrusion to once again inwardly flex, thereby extracting the peak from the window and allowing for removal. Of course, other means of permanently or removably attaching the lower half 314 to the collar 219 or the female plug 307 may be used such as, by way of non-limiting example, fixed pins, screws, clamps, spring-loaded pins, bolts, twist-and-lock connections, and the like.

As with the lower core 304, a spring 322 biases the upper core 305 away from the connecting plug 318 by pressing against one of the flanges 320, as shown in FIG. 11. An actuating block 324 is preferably attached to the upper core 305 at the grip, or distal, end of the upper core 305. Of course, the manner of attachment may include any of those discussed above with regard to the housing plug 308.

As shown in FIG. 11, a grip end of the upper hollow shaft 303 includes a plurality of holes 326 there through. In addition, the upper hollow shaft 303 has a top cutout 328 and a bottom cutout 330 (where the top and bottom are defined with regard to the location of the holes 326, which defines the sides). Of course, the term "cutout" does not implicate a method of forming the cutouts, as the cutouts 328, 330 may be formed by removing material or molding the upper hollow shaft 303 with the cutouts 328, 330 formed therein. Rather, the term refers to the space in the upper hollow shaft 303.

FIG. 11 also shows a handle generally 400 comprised of a right panel 402 and a left panel 404. Each of the right panel 402 and the left panel 404 preferably includes three protrusions 406 (two of which are long enough to extend through the holes 326 in the upper hollow shaft 303 and contact each other). The right panel 402 and the left panel 404 are secured together by screws passing through the protrusions 406 of one of the panels 402, 404 and into the protrusions 406 of the other panel 402, 404.

Of course, other means to hold the right panel 402 and the left panel 404 together may be used such as, by way of non-limiting example, bolts, pressure-fit pins, adhesive, and the like, and more or fewer than three protrusions and holes may be provided. Moreover, although only a right and left panel are described, a grip insert 405, preferably formed of a soft material, may also be provided.

Each of the right and left panels 402, 404 includes a curved portion so that when the panels 402, 404 are secured together by the screws to form the handle 400, a trigger opening 410 on the bottom is formed. The trigger opening 410 receives a trigger 412 there through. The trigger 412 is pivotally held in position by a pin (not shown), which passes either through or into panels 402, 404 and through a hole in the trigger 412. Of course, other means for pivotally supporting the trigger 412 may be used such as, by way of non-limiting example, a bolt, a screw, a hollow tube, and the like.

The trigger 412 includes a U-shaped extension or lip 416, a front face 418 of which is rectangular and has side rails 420. The rectangular front face 418 contacts the actuating block 324, and the rails 420 prevent the actuating block 324 from moving laterally. Of course, the rails need not be provided, and the front face 418 need not be rectangular. Further, any means of transforming a pivoting action into a linear action is acceptable, such as a cam and follower or a rack gear.

Each of the panels 402, 404 also includes a curved portion in its top, so that when the panels 402, 404 are secured together, a lock opening 414 is formed. The lock opening 414 receives a trigger lock 415, and includes ribs (not shown) for guiding the trigger lock 415. The trigger lock 415 includes a horizontal plate 422 and a vertical switch 424, as shown in FIG. 11.

The vertical switch 424 protrudes out of the lock opening 414 above an outer surface of the handle 400, so that a user can contact the vertical switch 424 with a finger, and extends below the horizontal plate 422 into the upper hollow shaft 303. The horizontal plate 422 slides along an axis parallel to a longitudinal axis of the upper hollow shaft 303, and is guided during such sliding motion by the ribs.

When a user pushes against or pulls on the vertical switch 424, the horizontal plate 422 slides along the upper hollow shaft 303 and within the ribs of the handle 400. In a locked position, the trigger lock 415 is in its most forward position. In an unlocked position, the trigger lock 415 is in its most rearward position. In the locked position, the vertical switch 424 contacts, or nearly contacts, the trigger 412. As such, when a user attempts to squeeze the trigger 412, a top of the trigger 412 contacts the vertical switch 424, preventing further movement of the trigger 412.

In operation, when the user desires to apply the contents of the container 5 to the surface being treated, the user simply squeezes the trigger 412. At this time, the trigger 412 pivots causing the lip 416 to press against the actuating block 324, which moves the upper core 305 downward toward canister 5. The upper core 305 moves through the circular cavity in the connecting plug 318 past the female plug 307 and contacts the lower core 304. As a result, the lower core 304 slides through the housing plug 308 and into the housing 200.

The bottom of the lower core 304 contacts the pivot link 216, causing the pivot link 216 to rotate, thereby moving the actuator rod 208 in an actuating direction toward the proximal end (i.e., in a direction substantially opposite to the sliding direction of the lower core 304). Thus, the pivot link 216 is a means for reversing a direction of force. The terminal end of the bottom end 212 of the actuator rod 208 slides up through the aperture 213 In the front panel 204 and contacts the pad 509 of the lever arm 508 of the over cap 500.

The lever arm 508 pivots toward the valve stem 7 on the canister 5, and the shoulder formed at the top of the cylindrical cavity portion of the stem socket 518 presses on the valve stem 7, opening a valve (not shown) in the canister 5 to allow projection of the contents of the canister 5 through the nozzle 503 and onto the surface to be treated. When the trigger 412 is released, the springs 310, 322 in the hollow shafts 302, 303, respectively, bias the cores 304, 305, respectively, upwards against the trigger 412, causing the trigger 412 to pivot back into its original, non-activated position.

This action relieves the force on the actuator rod 208 and allows the spring 230 to bias the actuator rod 208 away from the overcap 500. A spring (not shown) in the valve in the canister 5 returns the valve stem 7 back to its original position, closing the valve and stopping the contents of the canister 5 from exiting the canister 5.

Figures 12, 13, 14, 15:
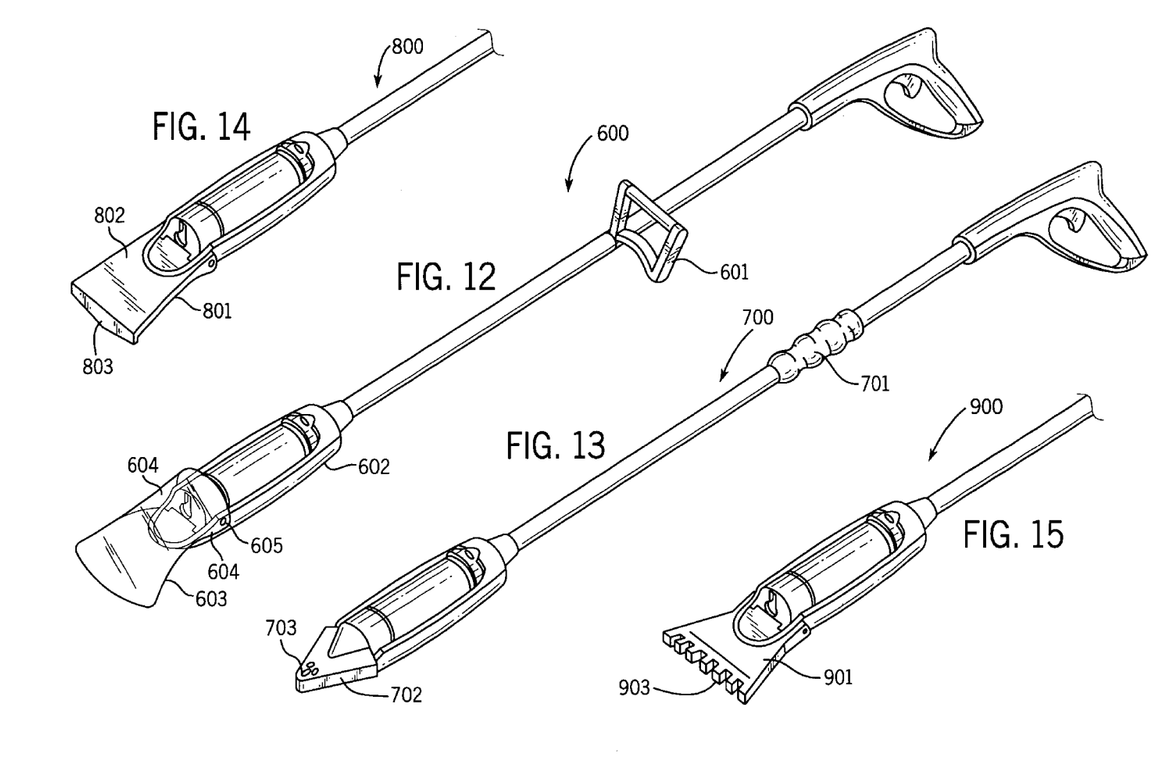
FIG. 12 is a perspective view showing a modified form of the device having an ergonomic second handle and a back spray protector attachment, focused on the outlet end of the device.
FIG. 13 is a view similar to FIG. 12, but of a third embodiment having a secondary grip and a wedge attachment for controlled treatment of corner areas.
FIG. 14 is a view similar to FIG. 12, but of a fourth embodiment having an applicator guide attachment in the form of a lower lip.
FIG. 15 is a view similar to FIG. 14, but of a fifth embodiment having a rake scraper attachment for exposing areas to be treated and smoothing them over thereafter.

FIG. 12 shows an alternative embodiment 600 in which an extra ergonomic support handle 601 has been attached onto one of the shafts to facilitate spraying. Also, the housing 602 includes a back spray protector hood/spray shroud 603 (particularly for overhead use) to prevent the application from spraying back onto the user. The attachment is a visor-shaped structure with two generally parallel sides 604 with tabs 605 that snap into openings in the front of the housing.

Of course, the tabs could be alternatively be formed in the housing and the openings in the attachment sides. The attachment can be detached by flexing the sides outward slightly to disengage the tabs and it can be pivoted downwardly out of the way of the canister. The attachment is preferably a rigid plastic and translucent, however, it can be any suitable material and opacity. Moreover, the back spray hood could be formed integral with the housing, instead of a separate attachment.

FIG. 13 shows a third embodiment 700 in which the ergonomic handle of FIG. 12 has been replaced with a rubber over grip 701 and the back spray protector of FIG. 12 has been replaced by a tapered wedge nozzle 702 that directs all sprays to a narrow tip designed to guide the device at corners (e.g. room corners). The spray exits the attachment though openings 703 near the tip. The attachment can be detached by pulling it away from the housing.

FIG. 14 shows the lower portion of a fourth embodiment 800 with an applicator attachment 801 that protects floors when spraying near cabinets, and may also help guide the spray angle adjacent the floor. The attachment can be flat, curved, angled or have a funneled guide portion 802 (shown flat) that wraps around the front end of the housing and connects thereto in a tab and slot arrangement. The guide portion terminates in an angled lip/guide lip 803.

FIG. 15 shows the lower portion of a fifth embodiment 900 where the front end of the housing has attached to it a rake 901. The rake attachment permits a consumer to expose an ant hill area or the like before spraying, and then smooth over the disturbed ground. Like the applicator guide attachment, the rake attachment has a curved end that fits the contour of the front end of the housing and connect thereto in a tab and slot connection. The free end of the rake attachment has short spaced tines 903.

Various other attachments or integrally formed tips can be provided to assist in the direction or pattern of the spray. For example, a tip attachment can have an narrow opening for a focused stream or a flat opening for a fan-shaped spray.

It should be appreciated that various other modifications to the preferred embodiments may be made without departing from the scope of the claimed invention. For example, as shown in U.S. Pat. No. 5,518,148, such devices can have a wheel attached to their lower end so that the member can be rolled along the ground as spraying occurs (e.g. adjacent the interface between a sidewalk and a building wall when spraying to protect against termites).

Also, while the shaft is preferably made of aluminum and the other parts other than the canister are preferably plastic (such as molded ABS resin), the exact materials are not critical. For example, these parts could be made of non-plastics, or of other plastics such as polypropylene.

As such, while this invention has been described with reference to what are currently considered to be the preferred embodiments, it is to be understood that the invention is not to be limited to just the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

INDUSTRIAL APPLICABILITY

The invention provides devices for delivering pesticides and agricultural chemicals via a remote sprayer.

We claim:

1. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the actuator cap being of the type having an arm pivotably linked to a cylindrical wall, the device comprising:

a housing for retaining the spray canister;

an actuator rod mounted on the housing so as to be capable of pushing against said cap arm when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing.

2. The device of claim 1, wherein said housing comprises a front panel and a back panel defining a space there between, and said actuator rod and said pivot link are disposed within the space defined by said front panel and said back panel.

3. The device of claim 1, further comprising a spray shroud mounted adjacent an end of the device opposite the handle.

4. The device of claim 3, wherein the device further comprises a second handle positioned between the spray shroud and the trigger.

5. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to be capable of pushing against a pivotable portion of the cap when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing; and wherein said shaft assembly comprises a lower hollow shaft, an upper hollow shaft attached to said lower hollow shaft, a lower slidable core disposed within said lower hollow shaft, and an upper slidable core disposed within said upper hollow shaft, wherein said handle is attached to said upper hollow shaft, and said lower hollow shaft is attached to said housing.

6. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to be capable of pushing against a pivotable portion of the cap when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing; and further comprising a rake attached to the device at an end of the device opposite the handle.

7. The device of claim 1, further comprising a guide lip attached adjacent to a lower edge of the housing at an end of the device opposite the handle.

8. The device of claim 1, further comprising a tapering spray guide attached adjacent an end of the device opposite the handle.

9. The device of claim 1, further comprising a biasing element configured to bias said actuator rod away from the cap.

10. The device of claim 1, wherein said actuator rod is slidably disposed in said housing.

11. The device of claim 1, wherein said trigger is adapted to push on the slidable core.

12. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to the capable of pushing against a pivotable portion of the cap when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing; and wherein said housing comprises a spring-biased retainer suitable to removably retain the canister in said housing if the canister is placed in the housing.

13. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to be capable of pushing against a pivotable portion of the cap when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing; and wherein said actuator rod slides in a direction substantially opposite to the first sliding direction of the slidable core.

14. The device of claim 1, wherein said housing includes an alignment feature engaging a complementary alignment feature in the cap so that the canister can be received in the housing in a specified orientation.

15. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to be capable of pushing against a pivotable portion of the cap when such a canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and a handle attached to said shaft assembly, said handle including a trigger;

wherein movement of the trigger causes a sliding of the slidable core in a first direction, which in turn pivots said pivot link, bringing said actuator rod into contact with the cap if the canister is mounted in the housing;

wherein said housing includes an alignment feature engaging a complementary alignment feature in the cap so that the canister can be received in the housing in a specified orientation; and wherein the cap alignment feature is a D-shaped recess sized to receive the alignment feature of the housing.

16. A device suitable for spraying an active selected from the group consisting of pesticidal sprays and agricultural chemical sprays from a spray canister, the canister being of the type having an actuator cap attached thereto such that movement of a portion of the cap against a valve stem of the canister can cause a spray to exit from the canister, the device comprising:

a housing for retaining the spray canister;

an actuator rod mounted on the housing so as to be capable of pushing against a pivotable portion of the cap when such a canister is mounted in the housing;

means for reversing a direction of an applied force;

a shaft assembly connected to said housing and including a slidable inner core for applying a force; and an actuator for actuating said inner core, wherein said means for reversing a direction of an applied force is disposed between said actuator rod and said actuator and causes said actuator rod to apply force in a direction substantially opposite to the force applied by said inner core.

17. A device suitable for spraying an active selected from the group consisting of pesticidal sprays and agricultural chemical sprays, the device comprising:

a spray canister having an actuator cap attached thereto such that movement of a portion of the cap against a valve stem of the canister can cause a spray to exit from the canister, wherein the cap has non-moving parts secured to the spray canister in non-moving relation, a lever arm hingely attached to said non-moving parts, and a nozzle disposed within said lever arm, said nozzle including a stem socket adapted to receive a valve stem of the spray canister;

a housing for retaining the spray canister;

an actuator rod mounted on the housing so as to be capable of pushing against a pivotable portion of the cap when the canister is mounted in the housing;

a pivot link pivotally attached to said housing about a pivot point, the pivot link having a first end and a second end separated by the pivot point there between, the pivot point being positioned to allow contact between said actuator rod and the first end of said pivot link;

a shaft assembly connected to said housing and including a core slidably disposed there within, the slidable core adapted to contact the second end of said pivot link and rotate said pivot link about the pivot point; and handle attached to said shaft assembly, said handle including a trigger;

wherein movement of the trigger causes a sliding of the slidable core in a first direction, which in turn pivots said pivot link, bringing said actuator rod into contact with the cap.

18. A device suitable for spraying an active selected from the group consisting of pesticidal sprays and agricultural chemical sprays, the device comprising:

a spray canister having an actuator cap attached thereto such that movement of a portion of the cap against a valve stem of the canister can cause a spray to exit from the canister, wherein the cap has non-moving parts secured to the spray canister in non-moving relation, a lever arm hingedly attached to said non-moving parts, and a nozzle disposed within said lever arm, said nozzle including a stem socket adapted to receive a valve stem of the spray canister;

a housing for retaining the spray canister;

an actuator rod mounted on the housing so as to be capable of pushing against a pivotable portion of the cap when the canister is mounted in the housing;

means for reversing a direction of an applied force;

a shaft assembly connected to said housing and including a slidable inner core for applying a force; and an actuator for actuating said inner core, wherein said means for reversing a direction of an applied force is disposed between said actuator rod and said actuator and causes said actuator rod to apply force in a direction substantially opposite to the force applied by said inner core.

* * * * *